(12) United States Patent
Bostick et al.

(10) Patent No.: US 10,043,221 B2
(45) Date of Patent: Aug. 7, 2018

(54) ASSIGNING CONFIDENCE LEVELS TO ONLINE PROFILES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 14/929,790

(22) Filed: Nov. 2, 2015

(65) Prior Publication Data

US 2017/0124082 A1    May 4, 2017

(51) Int. Cl.
*G06F 17/30* (2006.01)
*G06Q 50/00* (2012.01)

(52) U.S. Cl.
CPC ....... *G06Q 50/01* (2013.01); *G06F 17/30702* (2013.01)

(58) Field of Classification Search
USPC .................................. 707/706, 727
See application file for complete search history.

(56) References Cited

U.S. PATENT DOCUMENTS

| | | | | |
|---|---|---|---|---|
| 7,527,195 B2 * | 5/2009 | Keithley | ............... | G06Q 20/40 235/380 |
| 8,296,323 B2 * | 10/2012 | Pollard | ............ | G06Q 10/0637 705/44 |
| 8,364,713 B2 * | 1/2013 | Pollard | ............... | G06F 21/6245 705/44 |
| 8,380,803 B1 * | 2/2013 | Stibel | ................. | G06Q 30/0255 705/319 |
| 8,433,648 B2 * | 4/2013 | Keithley | ................ | G06Q 20/20 705/38 |
| 8,606,643 B2 | 12/2013 | Lawrence et al. | | |
| 8,630,990 B2 * | 1/2014 | Gowel | ..................... | G09B 7/00 707/705 |
| 8,713,450 B2 | 4/2014 | Garbow et al. | | |
| 8,756,099 B2 * | 6/2014 | Keithley | .............. | G06Q 20/401 705/14.1 |

(Continued)

FOREIGN PATENT DOCUMENTS

WO    2011091116 A2    7/2011

OTHER PUBLICATIONS

Non Final Office Action dated Sep. 10, 2017 for U.S. Appl. No. 14/929,824, filed Nov. 2, 2015; pp. 21.

(Continued)

*Primary Examiner* — Kim Nguyen
(74) *Attorney, Agent, or Firm* — Daniel Simek; Hoffman Warnick LLC

(57) ABSTRACT

The disclosure is directed to a method for assigning confidence levels to data. A method in accordance with an embodiment includes: analyzing at least one data stream from at least one social media account associated with an entity to generate historical data for the entity; comparing the historical data for the entity to profile data in an entity profile of the entity; determining at least one confidence level based on the comparing; and assigning the at least one confidence level to at least one data item in the profile data.

8 Claims, 4 Drawing Sheets

(56) References Cited

U.S. PATENT DOCUMENTS

| | | | |
|---|---|---|---|
| 8,782,217 | B1 | 7/2014 | Arone et al. |
| 9,674,214 | B2* | 6/2017 | Foster .................. H04L 63/14 |
| 2006/0161587 | A1 | 7/2006 | Woo |
| 2008/0168175 | A1 | 7/2008 | Tran |
| 2009/0089417 | A1 | 4/2009 | Giffin et al. |
| 2009/0189983 | A1 | 7/2009 | Brumfield et al. |
| 2011/0307403 | A1 | 12/2011 | Rostampour et al. |
| 2012/0137367 | A1 | 5/2012 | Dupont et al. |
| 2013/0124192 | A1 | 5/2013 | Lindmark et al. |
| 2014/0019295 | A1* | 1/2014 | Brownley .......... G06Q 30/0631 |
| | | | 705/26.7 |
| 2014/0156750 | A1 | 6/2014 | De Cristofaro et al. |
| 2015/0058273 | A1 | 2/2015 | Coden et al. |
| 2015/0180746 | A1 | 6/2015 | Day, II et al. |
| 2016/0119713 | A1 | 4/2016 | Knox et al. |

OTHER PUBLICATIONS

Kasperkevic, "LinkedUp: a dating app for the most professional of networks," Apr. 2014, 4 pages, http://www.theguardian.com/money/us-money-blog/2014/apr/20/dating.

Cruz, "Forget Tinder and OKCupid, use other social media to find a date," Aug. 2014, 7 pages, http://fusion.net/author/araceli-cruz.

Davis, "From online dating to driverless cars, machine learning is everywhere," Sep. 2014, 2 pages, http://www.theguardian.com/science/2014/sep/18/machine-learning.

Caitlin Roper Design, "How to create the perfect online dating profile, in 25 infographics," Feb. 2014, 10 pages, http://www.wired.com/2014/02/ how-to-creat-good-online-dating-profile/.

Norcie et al., "Bootstrapping Trust in Online Dating: Social Verification of Online Dating Profiles," Jun. 2013, 15 pages, Indiana University.

Duggan, "Is social media the new wingman for singles?," Nov. 2013, 2 pages, http//:www.pewresearch.org/fact-tank/203/11/12/is-social.

Takahashi, "How IBM's Michelle Zhou figured out my personality from 200 tweets (interview)," Oct. 2013, 6 pages, Business (http://venturebeat.com/category/business/).

Takahashi, "IBM researcher can decipher your personality from looking at 200 of your tweets," Oct. 2013, 8 pages, Business (http://venturebeat.com/category/business/).

Final Office Action dated Jan. 11, 2018 for U.S. Appl. No. 14/929,824, filed Nov. 2, 2015; pp. 21.

* cited by examiner

FIG. 2A

| Ranking | Entity |
|---|---|
| 1 | 16A |
| 2 | 16B |
| 3 | 16C |
| 4 | 16D |
| 5 | 16E |

| Ranking | Entity |
|---|---|
| 1 | 16C |
| 2 | 16B |
| 3 | 16A |
| 4 | 16D |
| 5 | 16E |

Entity 16C

| Data Item 36 | Confidence Level 28 |
|---|---|
| 1 | 100% |
| 2 | 50% |
| 3 | 0% |
| 4 | 75% |

FIG. 3B

Entity 16A

| Data Item 36 | Confidence Level 28 |
|---|---|
| 1 | 50% |
| 2 | 0% |
| 3 | 15% |
| 4 | 10% |

US 10,043,221 B2

ASSIGNING CONFIDENCE LEVELS TO ONLINE PROFILES

TECHNICAL FIELD

The present invention relates generally to Internet interactions between multiple entities, and more particularly, to a system and method for assigning confidence levels to profile data in online profiles.

RELATED ART

There are many services on the Internet that are geared for matching one entity to another entity based on some predetermined criteria. Such online services may include, for example, dating sites for matching a user to a potentially suitable mate, business/selling sites for matching a user with an entity providing a desired service or product, and/or the like.

Many of these online services require an entity (e.g., user, business, etc.) to generate an online profile summarizing various characteristics of the entity. The characteristics of the entity may be utilized to identify suitable matches for the entity, may be searched and viewed by other entities, and/or may be used for other purposes. Unfortunately, the information provided in an online profile may be intentionally inaccurate to bolster the persona of an entity, or may be entirely false (e.g., for use in a scam). The online profile is generally static, unless updated by the entity.

SUMMARY

A first aspect of the invention provides a method for assigning confidence levels to data, including: analyzing at least one data stream from at least one social media account associated with an entity to generate historical data for the entity; comparing the historical data for the entity to profile data in an entity profile of the entity; determining at least one confidence level based on the comparing; and assigning the at least one confidence level to at least one data item in the profile data.

A second aspect of the invention provides a matching service, including: a matching system for searching a plurality of entity profiles and for outputting search results 32 including a list of entities; an analysis engine for analyzing at least one data stream from at least one social media account associated with an entity to generate historical data for the entity, the entity having an entity profile in the plurality of entity profiles; a comparing system for comparing the historical data for the entity to profile data in the entity profile of the entity, determining at least one confidence level based on the comparing, and assigning the at least one confidence level to at least one data item in the profile data; and modifying the list of entities based on the at least one assigned confidence level.

A third aspect of the invention provides a computer program product comprising program code embodied in at least one computer-readable storage medium, which when executed, enables a computer system to implement a method for assigning confidence levels to data, the method including: analyzing at least one data stream from at least one social media account associated with an entity to generate historical data for the entity; comparing the historical data for the entity to profile data in an entity profile of the entity; determining at least one confidence level based on the comparing; and assigning the at least one confidence level to at least one data item in the profile data.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

FIGS. 2A, 2B, 3A, and 3B depict an example of the assignment of confidence levels by the online matching service of FIG. 1, according to embodiments.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The present invention relates generally to Internet interactions between multiple entities, and more particularly, to a system and method for assigning confidence levels to profile data in online profiles.

According to embodiments, confidence levels are generated for the profile data of an entity profile on a matching service. Such confidence levels provide a measure of the accuracy of the information provided in the online profile of the entity.

Figure 1:
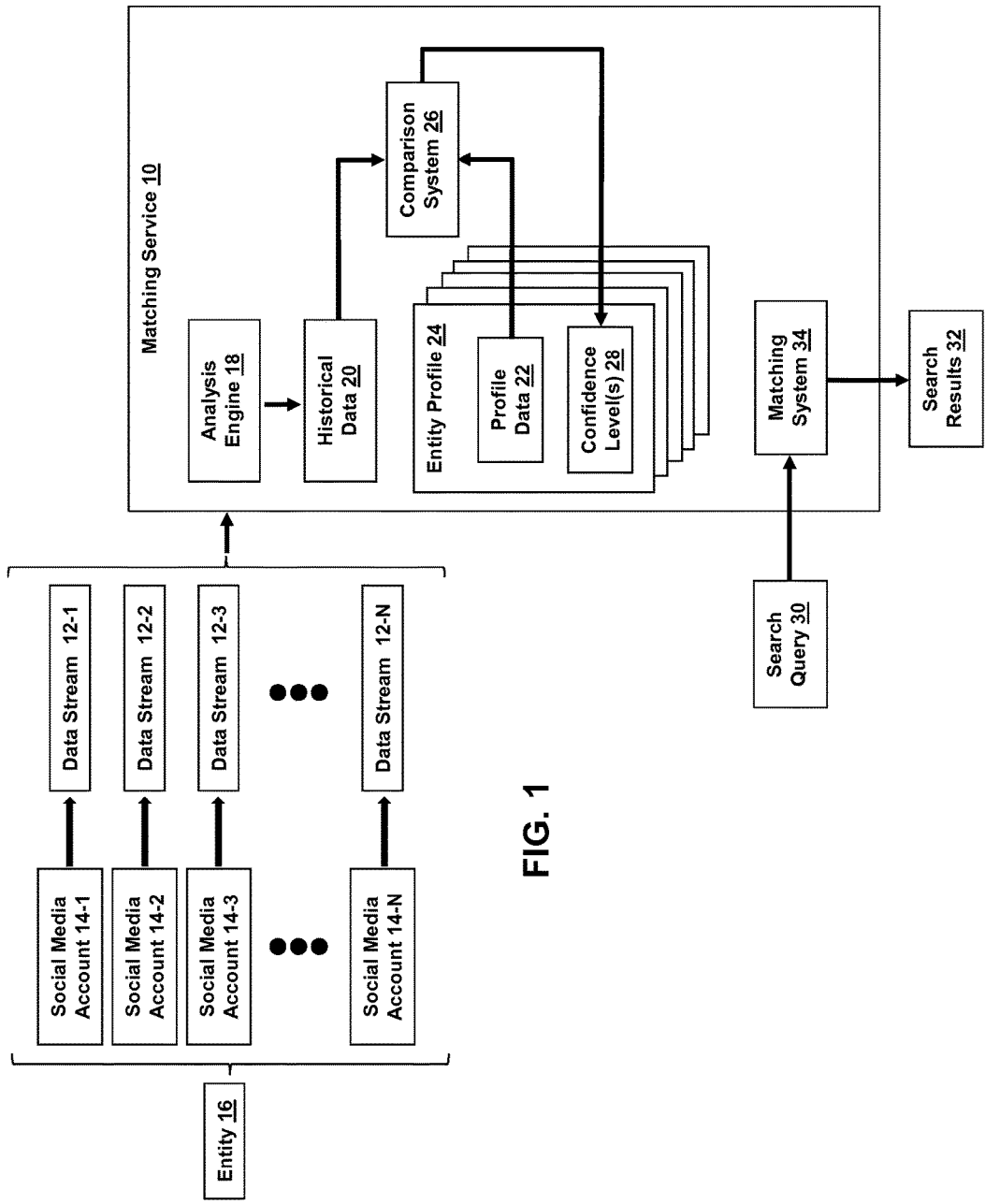
FIG. 1 depicts an online matching service for assigning a confidence level to profile data in online profiles, according to embodiments.

As depicted in FIG. 1, an online matching service 10 is provided with and/or is given access to at least one data stream 12 from at least one social media account 14 associated with an entity 16. N data streams 12 from N social media accounts 14 are shown in FIG. 1. The social media accounts 14 may include, for example, Facebook, Twitter, Linked In, Pinterest, Google+, Instagram, Craigslist, etc.

An analysis engine 18 performs an analysis on the data streams 12 to provide historical data 20 for the entity 16. The data streams 12 may include, for example, text, images, etc. (and associated metadata) posted by the entity 16 (e.g., authored by and/or shared by the entity 16) on the social media accounts 14. A comparison system 26 compares the historical data 20 to profile data 22 in an entity profile 24, previously generated by the entity 16 for the matching service 10. The comparison system 26 generates and assigns at least one confidence level 28 to the profile data 22 in the entity profile 24 based on the comparison. The comparison system 26 assigns a confidence level 28 to one or more individual data items within the profile data 22 in the entity profile 24. Further, the comparison system 26 may assign a combined confidence level 28 to the entity profile 24 itself. In general, the greater the correlation between the historical data 20 and the profile data 22, the higher the confidence levels 28 assigned by the comparison system 26.

The matching service 10 may use the confidence levels 28 during a search to move an entity 16 higher or lower in a set of search results 32. For instance, as depicted in FIGS. 2A, 2B, 3A, and 3B in conjunction with FIG. 1, in response to a search query 30, a matching system 34 may determine that the entity profiles 24 of several entities 16A, 16B, 16C, 16D, 16E contain profile data 22 that sufficiently matches a given search query 30. The initial ranking of the five highest matching entities 16A, 16B, 16C, 16D, 16E in the search query 30 is depicted in FIG. 2A.

FIG. 3A provides an example of the comparison system 26 assigning confidence levels 28 to four individual data items 36 in the profile data 22 entered by an entity 16C when completing an entity profile 24. When compared via the analysis engine 18 to historical data 20 obtained for the entity 16C, the comparison system 26 determines a confidence level 28 for each of the data items 36. In this example, the comparison system 26 has assigned confidence levels of 100%, 50%, 0%, and 75% to the data items 36. To this extent, the historical data 20 fully supports the first data item 36 entered by the entity 16C, partially supports the second and fourth data items 36 entered by the entity 16C, and provides zero support for the third data item 36 entered by the entity 16C. Thus, the comparison system 26 can infer that the entity 16C was very truthful when entering the first data item 36 in the entity profile 24, partially truthful when entering the second and fourth data items 36, and completely untruthful when entering the third data item 36. The use of percentages to represent confidence levels 28 in this example is not meant to be limiting; other ways of representing confidence levels 28 may also be used. For example, the confidence levels 28 may be represented using terminology such as "high," "medium," or "low," or "very good," "good," or "bad," using a scale from 0 to 100, and/or in any other suitable manner that indicates different levels of confidence.

FIG. 3B provides an example of the comparison system 26 assigning confidence levels 28 for the same four individual data items 36 in the profile data 22 entered by entity 16A when completing an entity profile 24. When compared via the analysis engine 18 to historical data 20 obtained for the entity 16A, the comparison system 26 determines a confidence level 28 for each of the data items 36. In this example, the comparison system 26 has assigned confidence levels of 50%, 0%, 15%, and 10% to the data items 36. To this extent, the historical data 20 partially supports the first data item entered by the entity 16, barely supports the third and fourth data items 36 entered by the entity 16, and provides zero support for the second data item 36 entered by the entity 16. Thus, the comparison system 26 can infer that the entity 16 was not very truthful when entering profile data 22 into their entity profile 24.

In this example, the matching system 34 may reverse the ranking of entity 16A and 16C in the search query 30 as indicated by arrow A in FIG. 2B. That is, based on the assigned confidence levels 28, the matching system may move the ranking of entity 16C higher up in the search query 30, and may move the ranking of entity 16A lower down the search query 30.

The example shown in FIGS. 2A, 2B, 3A, and 3B is provided for purposes of illustration only. In general, according to embodiments, the greater the correlation of historical data 20 with profile data 22 in an entity profile 24, the higher the assigned confidence levels 28, and the higher an entity 16 may rise toward the top of the search query 30.

Analogously, the lower the correlation of historical data 20 associated with profile data 22 in an entity profile 24, the lower the assigned confidence levels 28, and the lower an entity 16 may sink in the search query.

The analysis engine 18 obtains historical data 20 from social media accounts 14 to provide, for example, an indication of the posts that are positive in nature versus the percentage of posts that are negative in nature on a plurality of different topics. That is, analysis engine 18 may determine an indication of the sentiment of an entity 16 based on the historical data 20. For instance, the analysis engine 18 may determine based on an analysis of the historical data 20 that an entity 16 loves the sport of baseball, but loathes the sport of tennis. The analysis engine 18 may further determine based on an analysis of the historical data 20 the percentage of posts (and how often such posts are made) related to sports, politics, products, services, etc. and the positive/negative sentiments of an entity 16 regarding such topics. The historical data 20 may also be include mobile phone tracking data. The analysis engine 18 may use the tracking data to determine an entity's location/travel history, the types of people the entity interacts with, etc., which the comparison system 26 may use in the determination of confidence levels 28 for an entity 16.

As described above, the analysis engine 18 can analyze one or more data streams 12 of data from one or more social media accounts 14 to determine the "truthfulness" of the subjects and sentiments that an entity 16 has provided in their entity profile 24 and/or the overall truthfulness of the entire entity profile 24. While the entity profile 24 might represent who the entity 16 hopes to be, the historical data 20 may suggest that the entity 16 is actually quite different. When matching entity profiles 24, the matching system 34 may move the entity profiles 24 having higher confidence levels 28 generated from historical data 20 to the top of the search query 30. The more historical data 20 that is collected, the better the accuracy and reliability of the historical data 20.

The use of confidence levels 28 provides an entity 16 who is performing a search with an indication of the accuracy of the profile data 22 of other entities 16. Such profile data 22 may include, for example, pictures, age information, job information, and other information posted by the entity 16 in their entity profile 24. Confidence levels 28 on any aspect of profile knowledge may be high, low, or unknown. In the case where confidence levels 28 are low, the matching system 34 may more easily discard or reduce the significance of associated entity profiles 24 during a search. In cases where confidence levels 28 are high, the matching system 34 may move the corresponding entity profiles 24 toward the top of any search query 30.

An entity 16 may couple at least one data stream 12 from at least one social media account 14 to an entity profile 24. A larger number of coupled data streams 12 should provide more historical data 20 for the entity 16.

Figure 4:
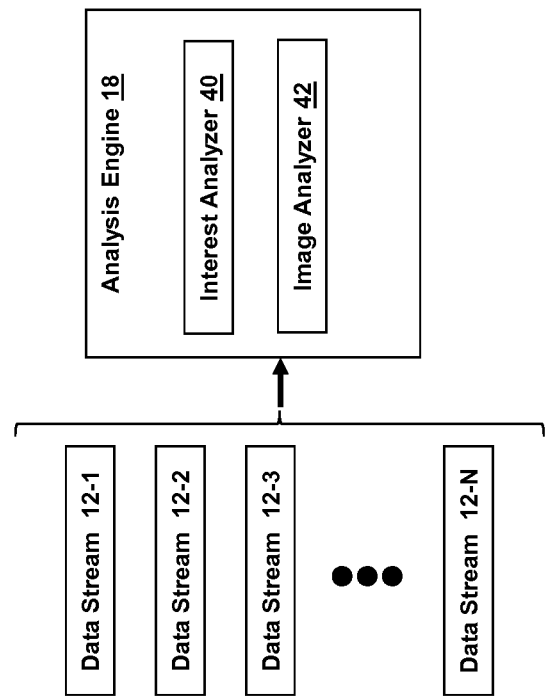
FIG. 4 depicts the analysis engine of the online matching service of FIG. 1, according to embodiments.

The analysis engine 18 is shown in greater detail in FIG. 4. The analysis engine 18 is provided access to at least one data stream 12 from at least one social media account 14 associated with an entity 16. The social media accounts 14 may include, for example, Facebook, Twitter, LinkedIn, Pinterest, Google+, Instagram, Craigslist, etc. The data streams 12 may include, for example, text, images, etc. (and associated metadata) posted by the entity 16 on the social media accounts 14. The analysis engine 18 may include, for example, an interest analyzer 40 and an image analyzer 42, which are configured to determine and track the content of each data stream 12 as well as the sentiment of the entity 16.

The analysis engine 18 may be implemented, for example, using any suitable text analysis software, image analysis software, and/or the like. Sentiment information in the data streams 12 may be determined using, for example, using natural language processing (NLP).

The analysis engine 18 may use the historical data 20 to refute a statement made by an entity 16 in an entity profile 24 (e.g., based on a low confidence level 28), and to reinforce a statement made by an entity 16 in an entity profile 24 (e.g., based on a high confidence level 28). For example, the profile data 22 in an entity profile 24 may indicate that an entity 16 is seeking a steady relationship, and yet the historical data 20 captured by the analysis engine 18 from the social media data streams 12 posted by the entity 16 may indicate that the entity 16 is more interested in partying and dating several people at once. Thus, what the entity 16 wants, or hopes to obtain, as evidenced by statements made by the entity 16 in the profile data 22 of an entity profile 24, may be vastly different from what the historical data 20 associated with the entity 16 actually indicates. In this case, the comparison system 26 would assign a low confidence level 28 to the entity's 16 statement regarding a desire for a long term relationship.

The interest analyzer 40 is configured to analyze text and images, (and associated metadata) in the data streams 12 in order to determine the subjects that are of interest to an entity 16 and associated sentiment. For example, the profile data 22 in the entity profile 24 of an entity 16 may state that the entity 16 likes to exercise and eat healthy. However, the interest analyzer 40 may determine from the profile data 22 posted by the entity 16 that the entity 16 eats quite a bit of junk food and has a negative attitude regarding exercise, thereby refuting the profile statement of the entity 16 regarding exercise and health. Such data may comprise, for example, multiple tweets describing visits by the entity 16 to fast food restaurants, a plurality of pictures of the entity 16 eating burgers, donuts, or other junk food, and sentiment of the entity 16 disparaging others who spend time exercising. In general, the interest analyzer 40 can determine interests of the entity 16 in any subject, including hobbies, travel, politics, religion, etc. In contrast to statements made by an entity 16 in an entity profile 24, which may or may not be accurate, the historical data 20 mined from the data streams 12 of the entity 16 may provide a much more realistic description of the interests of the entity 16.

The image analyzer 42 is configured to analyze images (and associated metadata) in the data streams 12, and to compare and verify the analyzed images against images previously posted by an entity 16 in the profile data 22 of their entity profile 24. The analyzed images may provide an indication of the accuracy of images in the profile data 22 of the entity profile 24. For example, the analyzed images and associated metadata may provide an indication of the accuracy of various physical characteristics of an entity 16, an indication of the quality of a service/product provided by an entity 16, and/or the like. For instance, if an entity 16 has recently posted several images in one or more social media accounts 14 that are similar (as determined by the image analyzer 42) to images previously posted by the entity 16 in their entity profile 24, then the comparison system 26 will assign a higher confidence level to the images in the entity profile 24. This may be used, for example, to confirm that the current appearance of an entity 16 is similar to that indicated by photos of the entity 16 posted in their entity profile 24. Contrastingly, if the image analyzer 42 determines that the recently posted images differ significantly from images previously posted by the entity 16 in their entity profile 24, then the comparison system 26 may assign a lower confidence level to the images in the entity profile 24.

Figure 5:
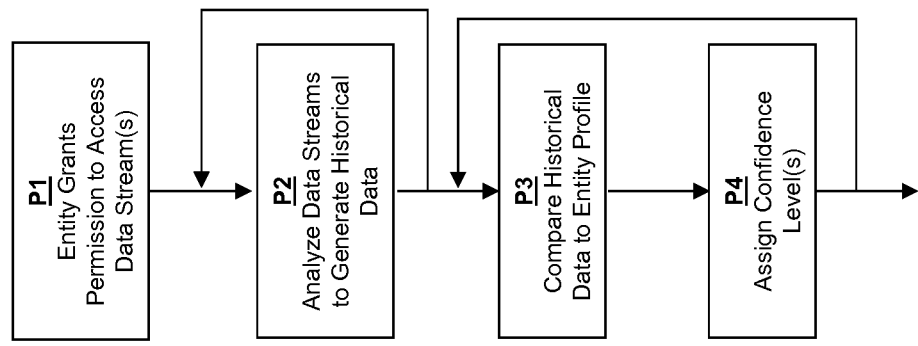
FIG. 5 depicts an illustrative flow diagram of a process for assigning confidence levels, according to embodiments.

A flow diagram of a process for assigning a confidence level to online profiles, according to embodiment, is provided in FIG. 5.

At process P1, an entity 16 grants permission to the matching service 10 to access at least one data stream 12 from at least one social media account 14. The entity 16 may set a privacy level at process P1 to limit the amount and type of data that can be accessed by the matching service 10 from each social media account 14. For example, the entity 16 may allow access to posts made by the entity 16 and posts regarding the entity 16 made by other entities 16. Posts may include, for example, text, pictures, and associated metadata.

At process P2, the interest analyzer 40 and image analyzer 42 of the analysis engine 18 analyze the data streams 12 to determine and categorize, for example, the subject matter and sentiment of the data contained in each data stream 12 to generate historical data 20. As time goes on, the analysis engine 18 iteratively generates more and more historical data 20 (e.g., continuously as the historical data 20 becomes available or periodically). While fewer comments, text snippets and images may have little bearing on any confidence levels 28, the more historical data 20 that is collected, the better the accuracy and reliability of the historical data 20. That is to say that over time, confidence levels 28 regarding the profile data 22 in the entity profile 24 of an entity 16 will increase with more solid data input. Process P2 may be repeated for any new data provided via any of the data streams 12.

At process P3, the comparison system 26 of the analysis engine 18 compares the profile data 22 of the entity profile 24 of the entity 16 with historical data 20 associated with the entity 16 gathered by the interest analyzer 40 and image analyzer 42 of the analysis engine 18. Based on this comparison, the comparison system 26 assigns confidence levels 28 at process P4 to various data items in the entity profile 24 and/or to the entity profile 24 itself. The comparison system 26 may repeat processes P3 and P4 (e.g., continuously or periodically as more historical data 20 becomes available) for any new historical data 20 generated by the analysis engine 18 to refine the assigned confidence levels 28 and/or to assign new confidence levels 28 to new data items in the entity profile 24.

As an example, let us assume that an entity 16 includes information in their entity profile 24 on the following topics:
a) Politics—the entity 16 states that they are interested in politics and that they belong to a particular political party;
b) Sports—the entity 16 expresses an opinion that the sport of baseball is boring; and
c) Music—the entity states that classic rock is their favorite genre of music.

Over time, the analysis engine 18 provides historical data 20 that may or may not support the information entered by the entity 16 in their entity profile 24. In the above example, the historical data 20 may contain very little information regarding the political views of the entity 16. To this extent, the entity 16 may not really be as interested in politics as the entity 16 has stated in the entity profile 24. Alternatively, the entity 16 may be interested in politics, but refrains from posting heated political exchanges. The analysis engine 18 may be able to differentiate between these two cases over time based on additional data provided via the data streams 12 from the social media accounts 14.

The analysis engine 18 may provide historical data 20 that indicates the entity 16 has a greater interest in "boring baseball" than expressed by the entity 16 in their entity profile 24. For example, the historical data 20 may show that the entity 16 has posted multiple entries over time regarding baseball in one or more of the social media accounts 14.

The analysis engine 18 may provide historical data 20 that confirms the entity 16 is a fan of classic rock. In addition, however, the historical data 20 may indicate that the entity 16 also has an interest in jazz, has attended multiple jazz concerts, and has visited or likes multiple jazz artist sites on the Internet.

The analysis engine 18 may provide historical data 20 that further indicates the entity 16, over time and through many conversations, rarely gets into arguments on any of the social media accounts 14. To this extent, the comparison system 26 may assign an entity 16 a high confidence level 28 regarding a relaxed temperament.

Confidence levels 28 may also be used in business transactions. For example, assume that an entity 16 wishes to meet another entity 16 in order to complete a transaction initiated via a website such as Craigslist. Often, the entities 16 do not know each other. In this case, one or both of the entities 16 may obtain confidence levels 28 regarding the other entity 16 prior to the meeting. Low or nonexistent confidence levels 28 may cause one or both of the entities 16 to back out of the transaction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 6:
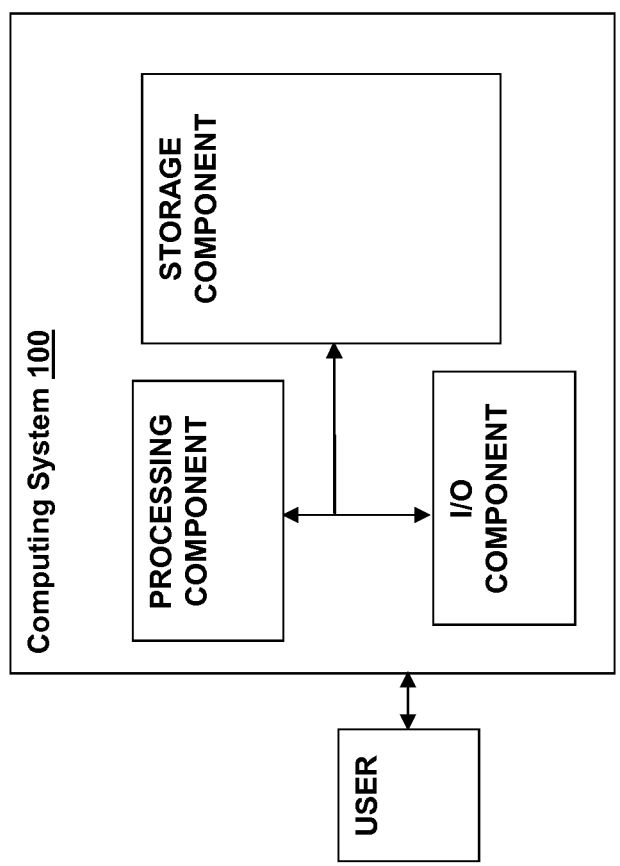
FIG. 6 shows an illustrative computing environment, according to embodiments.

FIG. 6 depicts an illustrative computing system 100 for implementing the present invention, according to embodiments. The computing system 100 may comprise any type of computing device and, and for example includes at least one processor, memory, an input/output (I/O) (e.g., one or more I/O interfaces and/or devices), and a communications pathway. In general, processor(s) execute program code, such as matching service 10, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices, which enable a user to interact with computing system 100.

Technical effects of the systems and methods disclosed herein include balancing network bandwidth by predicting network bandwidth requirements for each of a plurality of geographical regions based on an analysis of weather data and the social media sentiment. The embodiments discussed herein can allow hardware, software, and/or combinations thereof to automatically balance network bandwidth without intervention from a human user. In addition, the embodiments discussed herein can ensure that a VPN has adequate bandwidth to serve all users in all geographical regions during a given time period.

The various embodiments discussed herein can offer several technical and commercial advantages, some of which are discussed herein by way of example. Embodiments of the present disclosure can eliminate the deficiencies suffered by the reactive network bandwidth balancing techniques employed by the prior art. Furthermore, embodiments of the method discussed herein can be used to automatically balance network bandwidth to minimize the over/under subscribing of network resources.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for assigning confidence levels to data, comprising:
    analyzing at least one data stream from at least one social media account associated with an entity to generate historical data for the entity, the historical data including a current image of the entity;
    comparing the historical data for the entity to profile data in an entity profile of the entity, the profile data in the entity profile including a profile image of the entity;
    determining at least one confidence level based on the comparing;
    assigning the at least one confidence level to at least one data item in the profile data, and assigning an overall confidence level to the entire entity profile of the entity;
    wherein the analyzing further comprises analyzing text, at least one image, and associated metadata in each data stream to determine interests and sentiments of the entity;
    wherein the comparing further comprises comparing the current image of the entity in the historical data to the profile image of the entity in the profile data in the entity profile to confirm an appearance of the entity; and
    iteratively performing the analyzing, comparing, determining, and assigning to refine the at least one confidence level over time or to assign at least one new confidence level.

2. The method according to claim 1, further comprising granting permission, by the entity, for the at least one data stream from the at least one social media account to be analyzed to generate the historical data.

3. The method according to claim 1, wherein the determining further comprises determining a similarity of the historical data with the profile data in the entity profile of the entity.

4. A matching service, comprising:
    a matching system for searching a plurality of entity profiles and for outputting search results including a list of entities;
    an analysis engine for analyzing at least one data stream from at least one social media account associated with an entity to generate historical data for the entity, the entity having an entity profile in the plurality of entity profiles, the profile data including a profile image of the entity;
    a comparing system for comparing the historical data for the entity to profile data in the entity profile of the entity, the profile data in the entity profile including a profile image of the entity, and determining at least one confidence level based on the comparing,
    assigning the at least one confidence level to at least one data item in the profile data, and assigning an overall confidence level to the entire entity profile of the entity;
    wherein the analyzing further comprises analyzing text, at least one image, and associated metadata in each data stream to determine interests and sentiments of the entity;

wherein the comparing further comprises comparing the current image of the entity in the historical data to the profile image of the entity in the profile data in the entity profile to confirm an appearance of the entity;

modifying the list of entities based on the at least one assigned confidence level; and iteratively performing the analyzing, comparing, determining, and assigning to refine the at least one confidence level over time or to assign at least one new confidence level.

5. The matching service according to claim 4, wherein the modifying the list of entities further comprises moving the entity higher or lower in the list of entities based on the at least one assigned confidence level.

6. The matching service according to claim 4, wherein the entity grants permission for the at least one data stream from the at least one social media account to be analyzed by the analysis engine to generate the historical data.

7. A computer program product comprising program code embodied in at least one computer-readable storage medium, which when executed, enables a computer system to implement a method for assigning confidence levels to data, the method comprising:

analyzing at least one data stream from at least one social media account associated with an entity to generate historical data for the entity, the historical data including a current image of the entity;

comparing the historical data for the entity to profile data in an entity profile of the entity, the profile data in the entity profile including a profile image of the entity;

determining at least one confidence level based on the comparing;

assigning the at least one confidence level to at least one data item in the profile data, and assigning an overall confidence level to the entire entity profile of the entity;

wherein the analyzing further comprises analyzing text, at least one image, and associated metadata in each data stream to determine interests and sentiments of the entity;

wherein the comparing further comprises comparing the current image of the entity in the historical data to the profile image of the entity in the profile data in the entity profile to confirm an appearance of the entity; and iteratively performing the analyzing, comparing, determining, and assigning to refine the at least one confidence level over time or to assign at least one new confidence level.

8. The computer program product according to claim 7, the method further comprising granting permission, by the entity, for the at least one data stream from the at least one social media account to be analyzed to generate the historical data.

* * * * *